3,007,954
BINUCLEAR ARENE ORGANO-METALLIC
CARBONYLS
Roy L. Pruett, Charleston, W. Va., John E. Wyman,
Topsfield, Mass., and Donald R. Rink, Buffalo, and
Leo Parts, Snyder, N.Y., assignors to Union Carbide
Corporation, a corporation of New York
No Drawing. Filed Oct. 16, 1959, Ser. No. 846,781
8 Claims. (Cl. 260—429)

This invention relates to organo-metallic carbonyls. More particularly, this invention relates to binuclear arene metal carbonyls wherein only one arene group is bonded to each metal atom. This application is a continuation-in-part of copending application No. 760,556, filed September 12, 1958, now abandoned.

Bis(arene)organo-metallic compounds in which two aromatic hydrocarbon groups are bonded to each metal atom, for example bis(toluene)chromium and bis(benzene)molybdenum, have been prepared. Such compounds and a method for their production are disclosed in several published articles by E. O. Fischer and coworkers. See, for example, Z. Naturforschung 10$b$, 665 (1955); Chem. and Ind. 1956, 153; Z. Anorg. Allgem. Chem. 286, 142 (1956); ibid., p. 146; Ber. 89, 1805 (1956); ibid., p. 1809; and Angew. Chem. 68, 462 (1956).

We have now discovered a new and useful class of binuclear organo-metallic addition compounds wherein only one arene organic group is bonded to each metal atom. These novel compounds are arene metal carbonyls such as dibenzene divanadium hexacarbonyl, dibenzene dimanganese tetracarbonyl and ditoluene dirhenium tetracarbonyl.

The compounds of this invention may be represented by the formula:

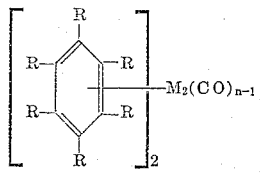

wherein M is selected from the group consisting of vanadium, niobium, tantalum, manganese and rhenium, each R group is selected from the class consisting of hydrogen and alkyl, $n$ is an integer defined by the relation $n=G-A-6$, A is the atomic number of the metal M, and G is the atomic number of next higher rare gas with respect to the metal M. That is, $n$ is equal to the atomic number of the rare gas next above M in the periodic classification of the chemical elements minus the atomic number of M minus six.

For the case wherein all R group are hydrogen and M is vanadium, G is equal to 36 (the atomic number of the rare gas krypton), A is equal to 23 (the atomic number of vanadium), $n$ is therefore equal to 7 and the formula becomes $(C_6H_6)_2V_2(CO)_6$. Similarly, for the case wherein all R groups are hydrogen and M is rhenium, $n=86-75-6=5$ and the formula becomes

$(C_6H_6)_2Re(CO)_4$

The organo-metallic compounds of the present invention may be characterized as addition compounds in contrast to organo-metallic substitution compounds. In the latter, a hydrogen or other substituent in the organic nucleus is substituted or removed in the formation of the organo-metallic compound. However, no hydrogen or alkyl substituent is removed from or replaced on the arene organic moiety in the formation of the arene metal carbonyls of this invention.

The bonding between the metal atom and the arene organic group takes place through six electrons of the benzene ring system of the arene organic group. This type of bond is discussed in more detail in an article by E. O. Fischer and H. P. Kogler, Angew. Chem. 68, 462 (1956). The substituents on the benzene ring system must, therefore, be of such size and number that the benzene ring may approach the metal atom sufficiently closely to permit stable bond formation to take place. Thus the presence of several tertiary alkyl substituents on the benzene ring might prevent formation of a binuclear arene metal carbonyl because the bulky tertiary alkyl substituents would not permit the benzene ring system to approach the metal atom sufficiently closely for stable bond formation to take place. Therefore, the present invention contemplates as compositions of matter stable binuclear organo-metallic carbonyls, that is, binuclear arene hydrocarbon metal carbonyls which are sufficiently stable to be isolated or identified.

When the metal M is vanadium, niobium or tantalum, the compounds of this invention may be produced by contacting a bis(arene hydrocarbon) metal compound with carbon monoxide under pressure at a temperature in the range of from about −50° C. to about 55° C. For example, contacting bis(benzene) vanadium with carbon monoxide under pressure at about 40° C. results in the formation of dibenzene divanadium hexacarbonyl.

The bis(arene hydrocarbon) metal compound may be prepared by the methods described by E. O. Fischer and coworkers in Ber. 90, 250 (1957), and Angew. Chem. 69, 207 (1957), that is by heating a mixutre of a halide of the metal, the arene hydrocarbon, anhydrous aluminum halide and aluminum powder.

Preferably, the reaction between the bis(arene hydrocarbon) metal compound and carbon monoxide may be carried out in an inert organic liquid reaction medium and the solvent most preferred is the same organic compound which forms the organic moiety of the organo-metallic reactant. For example, the reaction between bis(benzene) vanadium and carbon monoxide is preferably carried out using benzene as the solvent.

The temperatures at which the reaction may be carried out vary over a considerable range of from about −50° C. to about 55° C. At temperatures above about 50° C. the yield of di(aromatic hydrocarbon) dimetal carbonyl decreases rapidly and increasing amounts of a side product dimetal dodecacarbonyl are formed. Generally, temperatures in the range of about 35° C. to 45° C. are preferred.

Gaseous carbon monoxide is employed in the process at superatmospheric pressure, preferably substantially above 15 pounds per square inch gauge (p.s.i.g.). Optimum pressure is greater than about 500 p.s.i.g. for a high yield of organo-metallic carbonyl. The carbon monoxide may be diluted with another gas such as hydrogen, if desired.

The ratio of reactants is not critical, although approximately stoichiometric equivalents are preferred. A large stoichiometric excess of carbon monoxide for an extended reaction time causes reduced yields through decomposition of the desired product and the formation of side products.

The time employed for carrying out the reaction to form the organo-metallic carbonyl may vary over wide limits depending on the temperature and pressure employed. Generally, it is preferred to maintain the reactants under the desired conditions for at least 15 minutes. If stoichiometric amounts of reactants are used, then a reaction time of several hours is not detrimental.

Illustrative of the method for preparing the vanadium, tantalum or niobium compounds of this invention is the following: In a 500 milliliter stainless steel pressure vessel was placed 9.44 grams (0.04 mole) of bis(toluene) vanadium and 200 milliliters of nitrogen purged toluene. The above operation was conducted in a dry box under a nitrogen atmosphere. The vessel was closed in a dry box, placed in a rocking furnace, and pressurized with 750 pounds per square inch gauge (p.s.i.g.) of carbon monoxide and 150 p.s.i.g. of hydrogen giving a total pressure of 900 p.s.i.g. The vessel was rocked for ten minutes at 20° C. during which time the pressure dropped to 840 p.s.i.g. The pressure vessel was then heated at 45° C. for 30 minutes. After cooling to room temperature, a total pressure drop of 190 p.s.i.g. had occurred. The vessel was opened in the dry box under a nitrogen atmosphere and the liquid containing the ditoluene divanadium hexacarbonyl as suspended solid was decanted into a flask and evaporated to dryness under a partial vacuum. Ditoluene divanadium hexacarbonyl was isolated as a finely divided red solid.

Ditoluene divanadium hexacarbonyl is a red solid slightly soluble in diethyl ether, chloroform, carbon disulfide and toluene. It is sensitive to oxidation, changing to a black solid on exposure to air.

In a further example about 2 grams of bis(cumene) vanadium dissolved in cumene is placed in a steel pressure vessel and the vessel closed. Carbon monoxide is then added to a pressure of 700 p.s.i.g. and the vessel while rocking is heated to about 55° C. After about 2 hours at this temperature the vessel is cooled and the excess pressure vented. The contents in the vessel are filtered and the cumene is evaporated from the filtrate under reduced pressure. Dicumene divanadium hexacarbonyl may then be isolated from the filtrate residue.

In a similar manner dihexamethylbenzene divanadium hexacarbonyl is prepared using bis(hexamethylbenezene) vanadium as the starting material and heptane as the solvent.

When the metal M is manganese or rhenium, the compounds of this invention may be produced by reacting a metal carbonyl with an arene organic compound in the presence of a liquid organic solvent. For example, reacting dimanganese decacarbonyl with toluene gives ditoluene dimanganese tetracarbonyl.

It is preferable to employ an excess of the aromatic reactant as a solvent for the metal carbonyl. However, the reaction between the aromatic compound and the metal carbonyl may be carried out in an inert hydrocarbon solvent, such as heptane, petroleum ether or an aromatic compound which does not form an arene metal carbonyl under the particular reaction conditions.

In the preferred form of the reaction, a basic catalyst is added to the reaction mixture. The basic catalysts of this invention are basic, nitrogen-containing liquid organic compounds, preferably substituted pyridines or tertiary amines such as N,N-dimethylaniline, tributylamine, 2-methylpyridine, 2,6-dimethylpyridine, 2,4,6-trimethylpyridine and triethyl amine. The catalyst increases the rate of reaction and thus makes it possible to carry out the reaction at a lower temperature than that required in the absence of a catalyst. Trace amounts of catalyst are effective, but larger amounts are preferred, as described hereinbelow.

The temperature at which this reaction may be carried out may vary over a considerable range of from 0° C. to 300° C. Temperatures up to about 50° C. are often satisfactory but in the interest of increasing the rate of reaction, higher temperatures are preferred. Temperatures in excess of the decomposition temperature of the products in the reaction medium employed should be avoided. Generally, it is preferred to employ temperatures in the range of 50° C. to 250° C.

The time necessary to carry out the reaction varies over wide limits depending on the temperature employed. The yields are not materially reduced by long time maintenance of reaction mixture under reaction conditions. Carbon monoxide gas is evolved during the course of the reaction, and it is generally preferred to maintain the reactants under the desired reaction conditions until carbon monoxide evolution essentially ceases.

The ratio of reactants is not critical and such ratios may be varied over wide limits. However, it is preferable to use the aromatic reagents in considerable excess, although stoichiometric amounts may be used. Further, for good yields, at least equal amounts of the metal carbonyl and catalyst should be used, although small quantities of the catalyst may also be used with success. The best yields are obtained when a considerable excess of both the catalyst and aromatic reactant are used.

For example, 50 milliliters of o-xylene, 50 milliliters of tri-n-butylamine and 1 gram of $Mn_2(CO)_{10}$ were heated under reflux in an argon atmosphere for two hours. During this time carbon monoxide was evolved and the solution became deeper yellow-orange. The solvent was evaporated under reduced pressure to give a viscous red liquid which was identified as di-ortho-xylene dimanganese tetracarbonyl.

In a similar manner, ditoluene dirhenium tetracarbonyl is prepared by reacting $Re_2(CO)_{10}$ with toluene using triethyl amine as a catalyst and dimensitylene dimanganese tetracarbonyl is prepared by reacting $Mn_2(CO)_{10}$ with mesitylene using 2-methylpyridine as a catalyst.

The compounds of this invention may be used to deposit a metallic film on various substrates and as antiknock additives for motor fuels.

For coating glass cloth, a quantity of an arene metal carbonyl of this invention, ditoluene divanadium hexacarbonyl for example, is sealed in an evacuated glass tube with a strip of glass cloth which has previously been dried in an oven at 150° C. for one hour. The tube is then heated above the decomposition temperature of the carbonyl for about one hour, cooled and opened. The glass cloth increases in weight by up to about 0.01 gram per gram of glass cloth and has a resistivity of several ohms per centimeter. Thus, a conducting cloth may be prepared which is useful for the reduction of static charge.

The manganese compounds of this invention, for example, ditoluene dimanganese tetracarbonyl, are soluble in motor fuels used in internal combustion engines. When added to such motor fuels, the manganese compounds of this invention produce an increase in the octane rating of the fuel mixture.

What is claimed is:

1. As compositions of matter the stable binuclear arene organometallic carbonyls having the formula

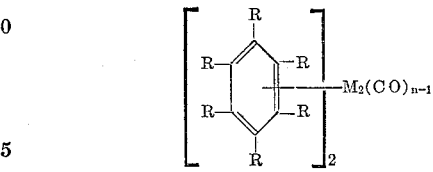

wherein:

(1) M is selected from the group consisting of vanadium, niobium, tantalum, manganese and rhenium.
(2) Each R group is selected from the class consisting of hydrogen and lower alkyl.
(3) $n$ is an integer defined by the relation $n=G-A-6$.
(4) A is the atomic number of M.
(5) G is the atomic number of the next higher rare gas with respect to said metal M, and
(6) Only one arene organic group is bonded to each metal atom.

2. The compositions of matter in accordance with claim 1 wherein M is vanadium, from zero to two R groups are methyl and the remaining R groups are hydrogen.
3. The compositions of matter in accordance with claim 1 wherein M is manganese, from zero to two R groups are methyl and the remaining R groups are hydrogen.
4. Dibenzene divanadium hexacarbonyl.
5. Ditoluene divanadium hexacarbonyl.
6. Dibenzene dimanganese tetracarbonyl.
7. Di-ortho-xylene dimanganese tetracarbonyl.
8. Ditoluene dirhenium tetracarbonyl.

No references cited.